US009971366B2

(12) United States Patent
Thøgersen et al.

(10) Patent No.: US 9,971,366 B2
(45) Date of Patent: *May 15, 2018

(54) METHOD FOR IN-SERVICE TESTING A CLIMATE CONTROL SYSTEM FOR A CONTAINER

(71) Applicant: THERMO KING CORPORATION, Minneapolis, MN (US)

(72) Inventors: Ole Thøgersen, Nyborg (DK); Allan Dyrmose, Ullerslev (DK)

(73) Assignee: THERMO KING CORPORATION, Minneapolis, MN (US)

( * ) Notice: Subject to any disclaimer, the term of this patent is extended or adjusted under 35 U.S.C. 154(b) by 281 days.

This patent is subject to a terminal disclaimer.

(21) Appl. No.: 14/804,639

(22) Filed: Jul. 21, 2015

(65) Prior Publication Data

US 2015/0323942 A1    Nov. 12, 2015

Related U.S. Application Data

(63) Continuation of application No. 13/396,686, filed on Feb. 15, 2012, now Pat. No. 9,097,456.

(30) Foreign Application Priority Data

Nov. 25, 2011 (EP) ..................... 11190707

(51) Int. Cl.
G05D 23/19 (2006.01)
G05B 23/02 (2006.01)
F25D 29/00 (2006.01)

(52) U.S. Cl.
CPC ....... *G05D 23/1917* (2013.01); *F25D 29/003* (2013.01); *G05B 23/0208* (2013.01); *F25D 29/008* (2013.01)

(58) Field of Classification Search
None
See application file for complete search history.

(56) References Cited

U.S. PATENT DOCUMENTS 1,331,018 A * 2/1920 Luthy ..................... H01M 2/18
429/143
4,663,725 A * 5/1987 Truckenbrod ..... B60H 1/00014
165/255

(Continued)

FOREIGN PATENT DOCUMENTS

EP  0492652  7/1992
JP  800166   1/1996

(Continued)

OTHER PUBLICATIONS

PCT/US2012/063495 International Search Report and Written Opinion dated Dec. 21, 2012 (8 pages).

(Continued)

*Primary Examiner* — Jason Lin
(74) *Attorney, Agent, or Firm* — Hamre, Schumann, Mueller & Larson, P.C.

(57) ABSTRACT

In-service diagnostic testing of containers with a climate control system used in intermodal freight transport includes automatically testing the functioning of the climate control system at a possibly pre-scheduled time which may depend on the period of time since the latest pre-trip inspection. According to the invention in-service diagnostic testing is performed with cargo in the container during transportation from origin to destination at a suitable time before expected arrival to the destination so that the approval resulting from the in-service diagnostic testing is fresh and up-to-date. Results of the in-service diagnostic testing are transmitted wirelessly to a receiver at a central facility where managing and allocating a large number of containers to individual transport tasks is performed, and containers which have not (Continued)

passed the in-service diagnostic testing can be taken out of service for maintenance and repair.

19 Claims, 2 Drawing Sheets

(56) References Cited

U.S. PATENT DOCUMENTS

| | | | | |
|---|---|---|---|---|
| 4,819,441 | A * | 4/1989 | Hanson | F25B 49/02 62/126 |
| 5,123,252 | A * | 6/1992 | Hanson | B60H 1/3225 165/256 |
| 5,161,384 | A * | 11/1992 | Hanson | B60H 1/00978 340/585 |
| 5,172,561 | A * | 12/1992 | Hanson | B60H 1/3225 62/127 |
| 5,181,389 | A * | 1/1993 | Hanson | B60H 1/00985 340/589 |
| 5,437,163 | A * | 8/1995 | Jurewicz | B60H 1/3232 374/E1.003 |
| 5,438,841 | A * | 8/1995 | Cahill-O'Brien | A23L 3/36 426/418 |
| 5,564,285 | A * | 10/1996 | Jurewicz | B60H 1/3225 340/585 |
| 5,579,648 | A * | 12/1996 | Hanson | F25D 29/003 62/126 |
| 6,041,605 | A * | 3/2000 | Heinrichs | F25B 49/022 62/193 |
| 6,067,805 | A * | 5/2000 | Porter | B60H 1/00978 62/125 |
| 6,138,461 | A | 10/2000 | Park et al. | |
| 6,176,095 | B1 * | 1/2001 | Porter | B60H 1/3225 62/126 |
| 6,233,952 | B1 * | 5/2001 | Porter | F25B 49/005 62/127 |
| 6,694,754 | B1 * | 2/2004 | Schenk | F25D 21/006 62/156 |
| 6,829,523 | B2 * | 12/2004 | Hanson | G05D 23/1902 165/200 |
| 6,996,997 | B2 * | 2/2006 | Wiff | F24F 11/0086 374/E15.001 |
| 7,455,225 | B1 * | 11/2008 | Hadfield | G07C 5/085 235/384 |
| 8,037,700 | B2 * | 10/2011 | Shah | F24F 11/006 62/181 |
| 2002/0184900 | A1 * | 12/2002 | Wellman | A47F 3/0443 62/155 |
| 2003/0177772 | A1 * | 9/2003 | Kwon | F25D 21/08 62/151 |
| 2003/0231029 | A1 * | 12/2003 | Tamura | H02H 7/0844 324/765.01 |
| 2005/0066671 | A1 * | 3/2005 | Srichai | B60H 1/00914 62/160 |
| 2005/0235660 | A1 * | 10/2005 | Pham | F04C 28/00 62/126 |
| 2006/0201168 | A1 * | 9/2006 | Kates | F24F 11/0086 62/129 |
| 2007/0089438 | A1 | 4/2007 | Singh et al. | |
| 2007/0238166 | A1 | 10/2007 | McNelly | |
| 2007/0267509 | A1 * | 11/2007 | Witty | G01D 9/005 236/51 |
| 2009/0056814 | A1 | 3/2009 | Rohde | |
| 2009/0062965 | A1 * | 3/2009 | Alhilo | G05B 5/01 700/278 |
| 2009/0272131 | A1 * | 11/2009 | McMasters | B60H 1/00585 62/77 |
| 2010/0111709 | A1 * | 5/2010 | Jayanth | F04C 23/008 417/44.11 |
| 2010/0152903 | A1 * | 6/2010 | Takenaka | F25B 9/008 700/275 |
| 2010/0293397 | A1 * | 11/2010 | Pham | F04B 49/065 713/300 |
| 2011/0247350 | A1 * | 10/2011 | Awwad | F25B 27/00 62/115 |
| 2012/0000212 | A1 * | 1/2012 | Sanders | F25D 29/003 62/62 |
| 2012/0067965 | A1 * | 3/2012 | Rajasekaran | B64F 1/362 236/44 C |
| 2012/0109469 | A1 * | 5/2012 | Pebley | B60H 1/322 701/48 |
| 2012/0271460 | A1 * | 10/2012 | Rognli | G05D 23/1934 700/276 |

FOREIGN PATENT DOCUMENTS

| | | |
|---|---|---|
| WO | 0134501 | 5/2001 |
| WO | 03021163 | 3/2003 |

OTHER PUBLICATIONS

"TracKing system rediines security for PACE Airfreight," Refrigerated Transporter, Dec. 28, 2009, Retrieved from internet on Oct. 23, 2012 <URL: http://refrigeratedtrans.com/information-management/tracking_system_redefines_security_for_pace_airfreight_1228/>.

"Thermo King adds security geo-fencing to TracKing," Motor transport, Apr. 26, 2007, Abstract Only, Retrieved from Internet on Oct. 23, 2012 <URL: http://connection.ebscohost.com/c/articles/25082308/thermo-king-adds-security-geo-fencing-tracking>.

Search Report from the European Patent Office for Application No. 11190707.7 dated May 1, 2012 (6 pages).

* cited by examiner

METHOD FOR IN-SERVICE TESTING A CLIMATE CONTROL SYSTEM FOR A CONTAINER

FIELD OF THE INVENTION

The invention relates to intermodal freight transport which involves the transportation of freight in an intermodal container or vehicle, using multiple modes of transportation such as rail, ship, and truck. In particular the invention relates to pre-trip inspection of containers with a climate control system used in intermodal freight transport, where e.g. climate sensitive cargo is transported. A pre-trip inspection includes inspecting and testing structural components of the container and its climate control system prior to loading cargo into the container with the aim of ensuring that only containers that fulfil certain quality criteria are used (as evidenced by a satisfactory pre-trip inspection report), and in particular that the container will perform as desired for at least a period including the next journey with cargo loaded into the container.

BACKGROUND OF THE INVENTION

Transporting and storing temperature sensitive cargo over periods of time may require a controlled climate in the space where the cargo is loaded. Climate control includes controlling temperature of the cargo and humidity of air in the container to be within acceptable limits. Controlling the temperature includes bringing the temperature of the cargo into the acceptable range, by refrigerating or heating, and maintaining the temperature within that range. Climate control may also include controlling composition and humidity of the air in the space where cargo is loaded.

The temperature of temperature sensitive cargo should be kept within predefined acceptable limits. Some cargo must be maintained frozen, and the temperature of any portion of the frozen cargo must be kept below a predefined freezing temperature which depends on the cargo, e.g. below −18 degrees Celsius (i.e., 0.4 degrees Fahrenheit) or lower, while commodities such as fresh fruit and vegetables should be kept chilled, but not frozen, to stay fresh.

During operation of a refrigeration system water vapour will condense on the evaporator and form a layer of ice that will degrade the efficiency of the evaporator and thereby of the refrigeration system. Accumulated ice is removed by running a defrosting cycle. Traditionally, defrosting cycles are initiated according to a predetermined schedule at time intervals which may depend on the nature of the cargo and the time since its loading into the container, or defrosting can be performed on demand based on actual findings.

Some cargos need relative humidity to be kept within acceptable limits. Some cargos are sensitive to high or low temperatures, while others are relatively insensitive to temperature. Examples of such products are electronic and optical products, scientific instruments, machinery and metals such as iron and steel that may corrode if the relative humidity is too high, clothing and other textiles where fungus growth can be prevented by keeping the relative humidity low.

For temperature sensitive cargo such as chilled and frozen cargo it is of vital importance that the cargo is kept within an acceptable temperature range, since the cargo might otherwise deteriorate and become worthless.

It is therefore usual to perform a pre-trip inspection, PTI, of the container where structural and functional components of the container are inspected and tested with the purpose of ascertaining that the container will be able to function properly for at least one more journey with cargo.

A container with its cargo is delivered to its destination where the cargo is removed from the container. The empty container may then be transported to an inspection facility where a PTI is performed on the empty container. Containers which meet the quality criteria pass the PTI are approved for continued use for a certain period before a new PTI must be performed. This approval is documented in a satisfactory PTI report, which most insurance carriers require prior to shipment. Containers which do not meet the quality criteria do not receive a satisfactory PTI report and are not approved for continued use and appropriate action is therefore taken to restore the quality e.g. by repair or adjustment. Such procedure is time consuming.

SUMMARY OF THE INVENTION

Pre-trip inspection includes inspecting structural components of the container for integrity and possible mechanical damage, which includes visual inspection.

According to the invention in-service diagnostic testing includes automatically testing the functioning of the climate control system at a possibly pre-scheduled time which may depend on the period of time since the latest pre-trip inspection, or the in-service diagnostic testing may be scheduled to be performed during transportation from origin to destination at a suitable time before expected arrival to the destination so that a satisfactory PTI report resulting from the in-service diagnostic testing is fresh and up-to-date. The in-service diagnostic testing may then advantageously be performed with cargo in the container.

When in-service diagnostic testing is performed the results of the tests are stored in a memory of the controller for later retrieval in the form of a PTI report. In an embodiment of the invention the results of in-service diagnostic testing are transmitted wirelessly (e.g. by satellite or a cellular telephone network) by the controller of the climate control system to a receiver at a central facility of the operator where managing and allocating a large number of containers to individual transport tasks is performed. The central facility can be a land-based maintenance and service facility and/or where containers are allocated to specific tasks or, when the containers are on board a ship, an on-board service facility where inspection data from several containers is collected and sent to a land based facility, or from where some repair and maintenance can be carried out on board.

At the central facility it will thus be known which containers are approved for further use and which ones need maintenance and repair. Containers which have not passed the in-service diagnostic testing and need maintenance and repair are thereby identified in advance of arrival to the destination and appropriate action can be planned ahead, and as soon as such a container arrives at its destination and is emptied it can be taken out of service.

Other aspects of the invention will become apparent by consideration of the detailed description and accompanying drawings.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
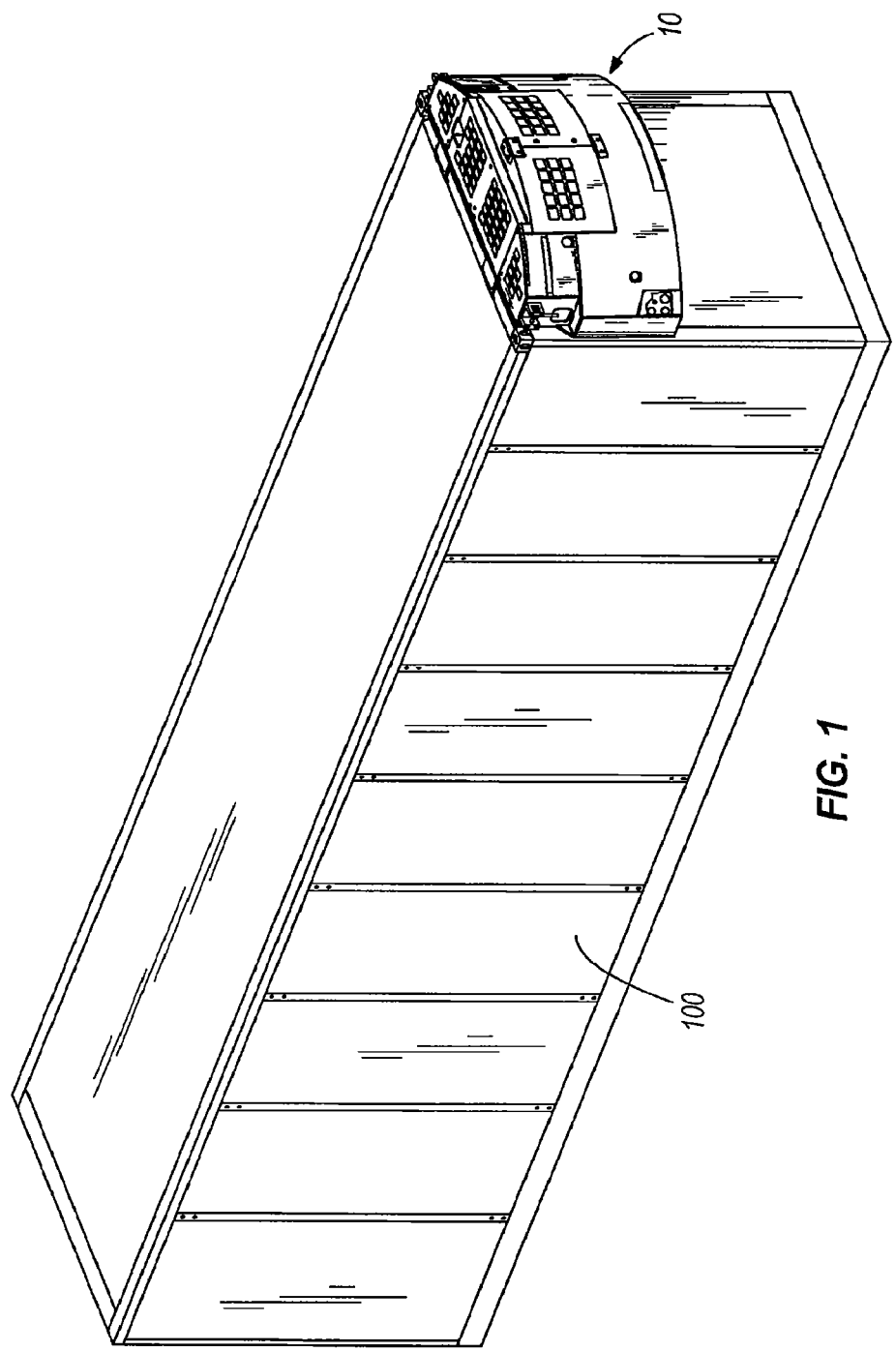
FIG. 1 is a perspective view of a container for transporting cargo.

FIG. 1 is a perspective view of a container 100 that can be used for transporting cargo of various types. Coupled to one end of the container is a climate control system 10 such as a refrigeration system which is used to control the climate, including e.g., the temperature and the humidity level, of the interior of the container 100. The container 100 could alternatively be a trailer, a railroad car, a straight truck cargo space, or other storage compartment used to transport cargo.

Figure 2:
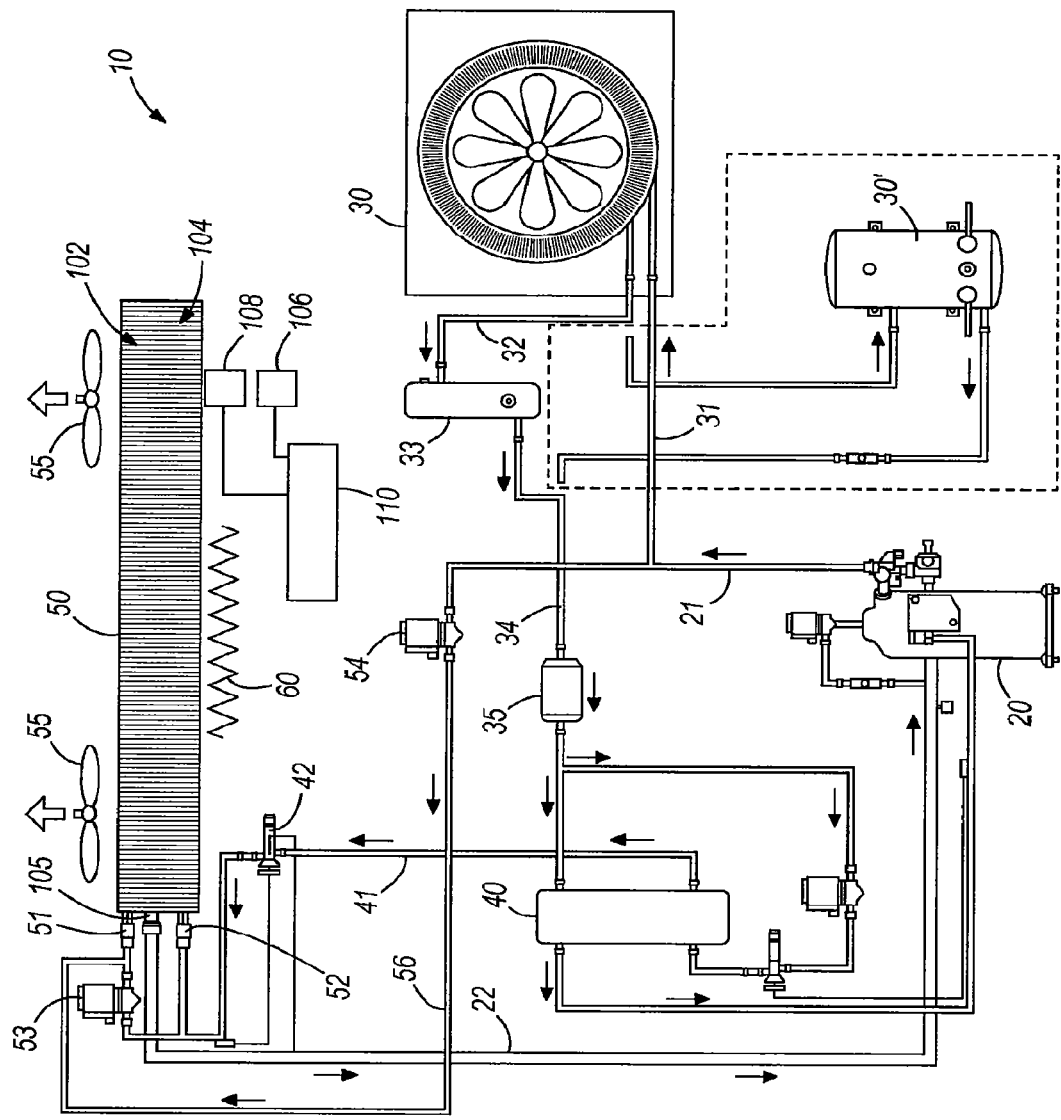
FIG. 2 is a schematic view of a refrigeration system that can be used with the container in FIG. 1.

FIG. 2 is a schematic view of the refrigeration system 10 which includes a dehumidification system. The illustrated embodiment includes a refrigeration system 10 with a compressor 20 which in operation compresses a fluid refrigerant used in the climate control system 10. Compressed and hot refrigerant is conducted from the compressor 20 through conduits 21 and 31 to a condenser 30 where heat energy is removed from the refrigerant. The shown condenser 30 is fan assisted, and condensed and cooled refrigerant leaves the condenser 30 through a conduit 32 and enters a receiver tank 33. If additional cooling of the refrigerant is desired, e.g., if sufficient cooling with air is not sufficient, an optional water-cooled condenser 30' (shown in a dash-line frame) may be used. From the receiver tank 33 (or optionally the water-cooled condenser 30') the condensed refrigerant is conducted through a conduit 34 (e.g., a liquid line) through a drier oil filter 35 to an economizer heat exchanger 40 and through a conduit 41 and a thermostatic expansion valve 42 to an evaporator 50. Fans 55 circulate the air through the evaporator 50 and through the interior of the container 100 in a direction shown by the arrows.

The evaporator 50 has a first part 102 and a second part 104. The evaporator 50 is a tube-fin-type heat exchanger. The refrigerant in the first part 102 and the second part 104 reaches a discharge point 105 where the refrigerant leaves the evaporator 50 and is returned to the compressor 20 via a return conduit 22.

The climate control system 10 has a first distributor 51 and a second distributor 52 each of which is connected to receive cold condensed refrigerant from the conduit 41 and the thermostatic expansion valve 42. The first distributor 51 may also receive refrigerant through a conduit 56 and feeds refrigerant to the tubes of the first part 102 of the evaporator 50, and the second distributor 52 feeds refrigerant to the tubes of the second part 104 of the evaporator 50. Control valves 53 and 54 control the flow of refrigerant to the respective distributors 51 and 52. A conduit 56 connects the outlet of the second control valve 54 with the inlet of the first distributor 51. Reference numerals 21, 22, 31, 32, 34, 41 and 56 denote conduits for conducting refrigerant.

A controller 110 controls the operation of the climate control system 10. A temperature sensitive element 108 measures the temperature of the interior of the container 100 and relays a signal representing the temperature to the controller 110. An electric heating element 60 arranged adjacent the evaporator 50 is used for defrosting and heating. A humidity sensor 106 is arranged for sensing the relative humidity of the air in the container 100 and outputs a corresponding signal to the controller 110 for determining whether the relative humidity is within acceptable limits.

According to the invention in-service diagnostic testing includes automatically testing the functioning of the climate control system 10 and its individual components at a time which may be pre-scheduled and may depend on the period of time since a previous or the latest pre-trip inspection.

Each component to be tested in in-service diagnostic testing is tested at a time where the test does not intervene in the normal operation of the climate control system, or when its effect on the normal operation is known and can be compensated for or can be neglected.

In in-service diagnostic testing according to the invention the power consumption of individual components of the climate control system is determined, preferably both in an activated state and in a deactivated state, where the determined power consumption is compared to a nominal value. Excessive deviations from a nominal value may indicate component failure and should be handled accordingly.

A. In a state of no activity of the climate control system 10, or where no activity is expected, in-service diagnostic testing may include observing the power consumption of the climate control system as a whole but also of individual components of the system. In this state only the controller 110 and possibly a few other components on standby are expected to consume power. If the total power consumption is below a predefined threshold this part of the in-service diagnostic testing is passed. On the other hand, if the total power consumption is above the predefined threshold this part of the in-service diagnostic testing is not passed and further tests may be initiated to identify the one or more components consuming more power than expected and acceptable.

In a state of no activity of the climate control system 10 the voltage and frequency of the power supply can be determined whereby the quality of the power supply can be determined and logged.

B. The heater 60 is used for defrosting the evaporator while components unrelated to defrosting are deactivated and the power consumption of the heater 30 is determined and compared to its nominal power consumption value. Possibly, the temperature sensitive element 108 may be used to verify that heat is actually produced as expected. Here, too, the voltage and frequency of the power supply can be determined whereby the quality of the power supply can be determined and logged.

C. The condenser 30 has a motor-driven fan that blows air past the condenser coil to remove heat from the coil. The condenser fan is active when the climate control system is activated, and the power consumption of the condenser fan can be determined in such periods. An air flow sensor may also be applied to determine that an air flow is actually generated by the condenser fan. Alternatively, the condenser fan can be activated in a state of no activity of the climate control system or during defrost.

D. Temperature sensors (not shown) are arranged in connection with the condenser for sensing the temperature of the ambient air and the temperature of the condenser coil. In order to verify the (relative) accuracy of these two temperature sensors the condenser fan motor is activated while the compressor is deactivated, e.g. during defrost. This will cause the condenser coil to assume the temperature of the ambient air, and the readings of the two temperature sensors should therefore be identical or near identical. If this is not the case a corrective measure could be exchanging one or both sensors, or taking the different readings into account when determining the difference between the two temperatures.

E. The compressor motor operates on a three phase electric power supply. If two phases in the power supplied to the system are interchanged the motor will rotate in the opposite direction of what is expected. In a simple test for whether this is the case the system will interchange two phases. The compressor will present different loads to its motor in the forward (normal) direction of rotation and in the reversed direction of rotation, and the compressor motor will have corresponding different power consumptions in the forward and the reverse directions of rotation. The different power consumptions can be used for testing and verifying that the three phases are correctly connected, and if not, taking appropriate corrective action such as interchanging two phases.

F. The climate control system may have pressure sensors for sensing the pressure drop across the evaporator 50. A supply pressure sensor senses the pressure of the refrigerant in the supply conduit between the thermostatic expansion valve 42 and the distributors 51 and 52, and a return pressure sensor senses the pressure of the refrigerant in the return conduit 22 between the discharge point 105 and the compressor 20. The pressure readings are used for monitoring the refrigerant pressure in the system, and the difference between the supply pressure and the return pressure in a refrigerant equalized state is an indicator of the flow of refrigerant through the evaporator and a comparison can be made to expected and acceptable values under the working conditions such as ambient temperature, the actual temperature in the container and the set-point temperature which is the target temperature.

G. The climate control system should be able to avoid excessively high refrigerant pressures which may potentially damage the system. The supply pressure sensor mentioned above and other pressure sensors may be used for this purpose. During such test the compressor 20 is operated at or near its maximum capacity whereby in particular the supply pressure increases to reach a maximum threshold pressure level which should not be exceeded during normal operation. It is tested that when this threshold pressure level is reached a safety routine should be activated to deactivate the compressor whereby the pressure will decrease. It is checked that the pressure actually decreases, and that when it has decreased below a second threshold pressure level the compressor will be activated again.

H. The economizer heat exchanger 40 is used for increasing the refrigeration capacity of the system if desired. For doing so a solenoid valve at the outlet side of the oil filter 35 is activated to lead refrigerant through a thermostatic expansion valve to the heat exchanger 40. The heat exchanger being active will represent an increased load on the compressor, whereby the power consumption of the compressor will increase. The increased power consumption indicates that the solenoid valve is operating as desired and, vice versa, if the power consumption of the compressor does not increase correspondingly this indicates that the solenoid valve is not operating as desired.

I. The motors of the fans 55 that circulate air through the evaporator 50 and through the interior of the container 100 are tested individually by activating the fans and determining their power consumption. The test is performed at different motor speeds and the corresponding power consumptions are determined and compared to acceptable values. A deviation from acceptable values indicate malfunction of the corresponding fan motor. An air flow sensor may also be applied to determine that an air flow is actually generated by the evaporator fans 50.

J. Temperature sensors are provided for sensing the temperature of the air supplied by the evaporator fans 50 to the container, the temperature of the air that is returned from the container and the temperature of the evaporator. One way of checking the accuracy of these sensors is to activate the evaporator fans 50 in a state of no other activity of the system. Hereby these three temperatures will tend to become equal, and the readings should therefore also be equal. Some cargo other than frozen cargo may produce heat, and in such cases the temperature of the return air will be correspondingly higher than the temperature of the supply air. Deviations from acceptable readings may indicate malfunction of one or more of the temperature sensors.

K. The climate control system will normally have activated periods of time where refrigeration is provided and the temperature in the container is lowered, and deactivated periods of time where no refrigeration is provided and the temperature in the container will increase due to a higher ambient temperature (in case heating is needed instead of refrigeration the situation is reversed). With a given ambient temperature and a given cargo and a given set-point temperature for the cargo it is possible to calculate or at least estimate the power consumption that is needed for a normally functioning climate control system to maintain the set-point temperature with the actual ambient temperature, where the difference between the ambient temperature and the set-point temperature is the temperature difference which the climate control system must maintain. Actual durations $t_a$ of activated periods of time and durations $t_p$ of the period of time between consecutive activations of the climate control system can be determined by simple measurements, and the ratio $t_a/t_p$ can then be calculated. The ratio $t_a/t_p$, also known as the duty cycle, is a number expressing the fraction of the total time where the climate control system is activated, i.e. where it provides refrigeration, and is an indicator e.g. of how close the system is working to its maximum capacity. Deviations, in particular when greater duty cycles than expected and acceptable are observed, indicate that the refrigeration capacity of the system is smaller than expected and possibly also below an acceptable limit. A reason for reduced refrigeration capacity can be that refrigerant is low and needs topping up.

L. While the container with its cargo is being transported by rail, ship or truck the controller 110 stores information about the result of the in-service diagnostic testing in a memory for later retrieval and sends to a receiver at a central facility a wireless message with corresponding information (i.e., testing results), and information identifying the container and the climate control system. The message is sent via a wireless connection such as a satellite connection or a cellular telephone network or other suitable wireless connection. The determination of whether the container including its climate control system has passed the testing and whether an approval for further service is issued can be made by the controller of the climate control system or at the central facility. If the climate control system has passed and is approved for further service, a satisfactory PTI report is generated for the climate control system. In addition to a newly performed test such determination can also be based on other data such as the history of the container including previous PTI reports of the system and its components, and also on experience gained from other containers or otherwise.

In-service diagnostic testing can be performed including any of the above described tests individually or some or all of them in any desired combination and also further tests not described here, all carried out under the control of the controller 110. A pre-trip inspection is traditionally performed on an empty container at a suitable time from arrival at its destination and after its cargo is unloaded. According to the method of the invention in-service diagnostic testing (to generate a PTI report) can be initiated by an operator or automatically by the system and the in-service diagnostic testing is performed automatically at a time where there is cargo in the container.

If the in-service diagnostic testing is passed the container and its climate control system are approved for further or continued use with cargo for a period until new in-service diagnostic testing must be performed, which allows the container and its climate control system to be used for one or more journeys with cargo. New in-service diagnostic testing can be scheduled to be performed in good time before the expiry of the approval period so that the approval period will not expire when the container is being transported with cargo.

The invention claimed is:

1. An automated method for in-service diagnostic testing a container, the container defining an enclosure for receiving a cargo to be transported from an origin to a destination when the cargo is in the container, the container including a climate control system controlling the climate in the enclosure, the climate control system having a plurality of interacting components and subsystems, and a controller controlling the operation of the climate control system, the method comprising:
running in-service diagnostic testing of one or more of the plurality of interacting components and subsystems to determine, with the cargo in the enclosure and while the container is being transported from the origin to the destination, whether the climate control system is operating within acceptable limits to provide climate control in the enclosure;
determining whether the climate control system is operating within acceptable limits to provide climate control in the enclosure;
generating, with the cargo in the enclosure and while the container is being transported from the origin to the destination, a satisfactory inspection report based on the climate control system operating within acceptable limits to provide climate control in the enclosure such that the climate control system is approved for further use in a container for transporting cargo.

2. The method of claim 1 further comprising
transmitting wirelessly to a receiver at a central facility determinations of whether the climate control system is operating within acceptable limits.

3. The method of claim 2 further comprising
generating a satisfactory PTI report at the central facility.

4. A method according to claim 1 wherein running in-service diagnostic testing includes:
based on properties of the cargo, on an ambient temperature and on a set-point temperature, determining a nominal duty cycle of the climate control system as the ratio of a duration of a period of time where the climate control system is activated to a duration of a period of time where the climate control system is deactivated;
observing a duration $t_a$ of a period of time where the climate control system is activated;
observing a duration $t_p$ of a period of time between consecutive activations of the climate control system;
determining the ratio $t_a/t_p$ of the observed duration $t_a$ of the period of time where the climate control system is activated to the observed duration $t_p$ of the period of time between consecutive activations of the climate control system; and
wherein determining whether the climate control system is operating within acceptable limits includes determining whether the determined ratio $t_a/t_p$ is within acceptable limits of nominal duty cycle of the climate control system.

5. A method according to claim 1 wherein running in-service diagnostic testing includes:
determining the power consumption of the climate control system as a whole when no activity of the climate control system is expected; and
determining whether the determined power consumption is below a predefined threshold.

6. A method according to claim 1 wherein running in-service diagnostic testing includes:
determining the power consumption of a heater used for defrosting an evaporator; and
wherein determining whether the climate control system is operating within acceptable limits includes determining whether the determined power consumption of the heater is within acceptable limits.

7. A method according to claim 6 wherein running in-service diagnostic testing includes:
using a temperature sensitive element to determine whether the heater produces heat.

8. A method according to claim 1 wherein running in-service diagnostic testing includes:
determining the power consumption of a condenser fan motor; and
wherein determining whether the climate control system is operating within acceptable limits includes determining whether the determined power consumption of the condenser fan motor is within acceptable limits.

9. A method according to claim 1 wherein running in-service diagnostic testing includes:
using an airflow sensor to determine whether a condenser fan motor is rotating a condenser fan to generate airflow.

10. A method according to claim 1 wherein running in-service diagnostic testing includes:
activating a condenser fan motor while a compressor of the climate control system is deactivated;
determining the temperature at a first temperature sensor arranged in connection with the condenser to sense an ambient temperature;
determining the temperature at a second temperature sensor arranged in connection with the condenser to sense the temperature of the condenser coil; and
determining whether the sensed temperatures of the first and second temperature sensors are identical.

11. A method according to claim 1 wherein running in-service diagnostic testing includes:
determining the power consumption of a compressor motor of the climate control system at different loads in the forward and reverse directions; and
wherein determining whether the climate control system is operating within acceptable limits includes determining whether the determined power consumptions of the compressor motor are within acceptable limits of a compressor motor having correctly connected three phase power.

12. A method according to claim 1 wherein running in-service diagnostic testing includes:
based on an ambient temperature, on a set-point temperature, and an actual temperature in the container, determining an expected pressure difference between a supply pressure and a return pressure of a refrigerant of the climate control system;

determining the pressure at a supply pressure sensor arranged upstream of the evaporator to sense the pressure of the refrigerant in the supply conduit;

determining the pressure at a return pressure sensor arranged downstream of the evaporator to sense the pressure of the refrigerant in the return conduit;

determining the sensed difference between the sensed supply pressure and the sensed return pressure; and wherein determining whether the climate control system is operating within acceptable limits includes determining whether the sensed difference is within acceptable limits of the expected pressure difference.

13. A method according to claim 1 wherein running in-service diagnostic testing includes:

operating a compressor at maximum capacity;

increasing a supply pressure to reach a maximum threshold pressure level;

deactivating the compressor after the supply pressure reached the maximum threshold pressure level; and determining whether the supply pressure decreases after the compressor is deactivated.

14. A method according to claim 1 wherein running in-service diagnostic testing includes:

activating a solenoid valve at the outlet side of an oil filter;

directing refrigerant from the activated solenoid valve to an expansion valve and heat exchanger of an economizer heat exchanger of the climate control system;

determining the power consumption of a compressor of the climate control system after the solenoid valve is activated, and determining whether the power consumption of the compressor increased after the solenoid valve is actuated.

15. A method according to claim 1 further comprising:

determining the power consumption of an evaporator fan motor; and wherein determining whether the climate control system is operating within acceptable limits includes determining whether the determined power consumption of the evaporator fan motor is within acceptable limits.

16. A method according to claim 1 further comprising:

using an airflow sensor to determine whether an evaporator fan motor is rotating an evaporator fan to generate airflow.

17. A method according to claim 1, wherein running in-service diagnostic testing includes:

activating an evaporator fan motor while a compressor of the climate control system is deactivated;

determining the temperature at a first temperature sensor arranged in connection with the evaporator to sense the return air temperature;

determining the temperature at a second temperature sensor arranged in connection with the evaporator to sense the supply air temperature; and determining whether the sensed temperatures of the first and second temperature sensors are equal.

18. The method according to claim 1, wherein running in-service diagnostic testing of one or more of the plurality of interacting components and subsystems to determine, with the cargo in the enclosure and while the container is being transported from the origin to the destination, whether the climate control system is operating within acceptable limits includes:

running in-service diagnostic testing on the climate control system during a defrost cycle of the climate control system.

19. The method according to claim 1, wherein running in-service diagnostic testing includes:

determining if a temperature sensor of the climate control system is accurately measuring temperature.

* * * * *